United States Patent
Aranguren et al.

(10) Patent No.: US 9,384,118 B2
(45) Date of Patent: *Jul. 5, 2016

(54) OVERLAY IDENTIFICATION OF DATA PROCESSING TARGET STRUCTURE

(71) Applicant: INTERNATIONAL BUSINESS MACHINES CORPORATION, Armonk, NY (US)

(72) Inventors: Herman Aranguren, Tucson, AZ (US); David B. LeGendre, Tucson, AZ (US); David C. Reed, Tucson, AZ (US); Max D. Smith, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 524 days.

This patent is subject to a terminal disclaimer.

(21) Appl. No.: 13/662,916

(22) Filed: Oct. 29, 2012

(65) Prior Publication Data

US 2013/0055219 A1 Feb. 28, 2013

Related U.S. Application Data

(63) Continuation of application No. 12/354,740, filed on Jan. 15, 2009, now Pat. No. 8,327,338.

(51) Int. Cl.
G06F 9/44 (2006.01)
G06F 9/46 (2006.01)
G06F 11/36 (2006.01)

(52) U.S. Cl.
CPC .................................... *G06F 11/366* (2013.01)

(58) Field of Classification Search
None
See application file for complete search history.

(56) References Cited

U.S. PATENT DOCUMENTS

| 4,829,422 | A * | 5/1989 | Morton et al. ................ 718/106 |
| 6,202,136 | B1 | 3/2001 | Wikle et al. |
| 6,560,772 | B1 | 5/2003 | Slinger |
| 6,678,838 | B1 | 1/2004 | Magro |
| 7,028,294 | B2 | 4/2006 | Cyran et al. |
| 7,222,332 | B2 | 5/2007 | Gschwind et al. |
| 7,607,047 | B2 | 10/2009 | Swoboda et al. |
| 7,788,645 | B2 * | 8/2010 | Agarwala ...................... 717/128 |
| 7,886,271 | B2 | 2/2011 | Agarwala et al. |

(Continued)

OTHER PUBLICATIONS

Peter Goldstein et al., "SAC2000: Signal Processing and Analysis Tools for Seismologists and Engineers", [Online], 2003, pp. 1-8, [Retrived from Internet on Nov. 18, 2014], <http://oasis.crs.inogs.it/static/doc/GoldsteinEtAl_2003_iaspei_sac.pdf>.*

(Continued)

*Primary Examiner* — Thuy Dao
*Assistant Examiner* — Ziaul A Chowdhury
(74) *Attorney, Agent, or Firm* — Griffiths & Seaton PLLC

(57) ABSTRACT

A method, system, and computer program product for identifying an overlay of a data processing target structure in a computing environment is provided. At least one of examining a mapping macro for the target structure with a set of valid ranges, comparing the set of valid ranges with the target structure to identify a string of at least one first invalid value and a last invalid value and locate invalid regions of the target structure, and examining executable code associated with the target structure, comparing at least one unchanged module against at least one additional module exhibiting an overlay characteristic to identify the string of the at least one first invalid value and the last invalid value and locate invalid regions of the target structure, is performed.

18 Claims, 4 Drawing Sheets

(56) References Cited

U.S. PATENT DOCUMENTS

| | | | |
|---|---|---|---|
| 8,375,366 B2* | 2/2013 | Agarwala et al. | 717/124 |
| 2002/0188929 A1 | 12/2002 | Cyran et al. | |
| 2004/0083455 A1 | 4/2004 | Gshwind et al. | |
| 2004/0111709 A1* | 6/2004 | Furst et al. | 717/131 |
| 2005/0120162 A1* | 6/2005 | Sivaram | 711/101 |
| 2006/0200308 A1* | 9/2006 | Arutunian | 701/208 |
| 2006/0225044 A1* | 10/2006 | Lewis | 717/127 |
| 2006/0259822 A1 | 11/2006 | Swoboda | |
| 2006/0259826 A1 | 11/2006 | Swoboda et al. | |
| 2007/0006172 A1* | 1/2007 | Swoboda et al. | 717/131 |
| 2007/0028067 A1 | 2/2007 | Hinrichs et al. | |
| 2009/0006907 A1* | 1/2009 | Little | 714/53 |
| 2009/0158205 A1* | 6/2009 | Hampton et al. | 715/790 |
| 2009/0259794 A1* | 10/2009 | Huber et al. | 711/100 |
| 2010/0125670 A1 | 5/2010 | Dondeti et al. | |

OTHER PUBLICATIONS

M. Adel et al. "Performance Study of New Segmented Overlay Marks for Advanced Wafer Processing", [Online], 2003, pp. 1-12, [Retrived from Internet on Nov. 18, 2014], <https://www.freescale.com/files/technology_manufacturing/doc/SPIE_2003_MICROLITHOGRAPHY_JA.pdf>.*

Xinyan Zhang et al. "CoolStreaming/DONet: A Data-Driven Overlay Network for Efficient Live Media Streaming", [Online], 2005, pp. 1-14, [Retrieved from Internet on Nov. 18, 2014], <http://cdnp2p.googlecode.com/svn/trunk/PeerCDN_v3/SurrogateServer/surrogate3/4.pdf>.*

Dejan Kostic et al., "Bullet: High Bandwidth Data Dissemination Using an Overlay Mesh", [Online], Oct. 2003, pp. 282-297, [Retrived from Internet on Nov. 18, 2014], <http://delivery.acm.org/10.1145/950000/945473/p282-kostic.pdf>.*

Orenstein et al., "PROBE Spatial Data Modeling in an Image Database and Query Processing Application", May 1988, retrieved from Internet on Jul. 17, 2012, <http://ieeexplore.ieee.org/stamp/stamp.jsp?tp=&arnumber=6139>.

Sullivan et al., "Software Defects and their Impact on System Availability—A Study of Field Failures in Operating Systems", 1991, retrieved from Internet on Jul. 17, 2012 <http://www.cs.unm.edu/~cris/591/sullivan91software.pdf>.

Pattabiraman et al., "Samurai: Protecting Critical Data in Unsafe Languages", Apr. 2008, retrieved from Internet on Jul. 18, 2012, <http://delivery.acm.org/10.1145.1360000/1352616/p219-pattabiraman.pdf>.

Lu, "STL on Limited Local Memory (LLM) Multi-core Processors", May 2012, retrieved from Internet on Jul. 18, 2012, <http://aviral.lab.asu.edu/temp/publications/thesis.DiThesis.pdf>.

* cited by examiner

OVERLAY IDENTIFICATION OF DATA PROCESSING TARGET STRUCTURE

CROSS REFERENCE TO RELATED APPLICATIONS

This application is a Continuation of U.S. patent application Ser. No. 12/354,740, filed on Jan. 15, 2009.

FIELD OF THE INVENTION

The present invention relates in general to computers, and more particularly to a method, system, and computer program product for overlay identification of a data processing target structure in a computing environment.

DESCRIPTION OF THE PRIOR ART

Computers, and computing environments, are used in virtually every setting, including at home, work, and school. Computer data storage provides one of the core functions of the modern computer, that of information retention. It is one of the fundamental components of all modern computers, and coupled with a central processing unit (CPU), implements the basic computer model used since the 1940s.

Computer software, or simply software, is a general term used to describe a collection of computer programs, procedures and documentation that perform tasks in a computing environment. This includes application software such as word processors that perform productive tasks for users, system software such as operating systems, which interface with hardware to provide the necessary services for application software, and middleware which controls and coordinates distributed systems.

Software generally uses computer data storage for a variety of purposes. For example, the software itself is stored on a computer data storage system. Additionally, software may use information such as a file, as in the case of word processors. The information contained in the file may be stored in a data storage system.

In some cases, software environments may cause data to be written to an existing portion of data storage. Such a scenario is referred to as an overlay. It is difficult for a user to diagnose overlays in data storage. The lack of identification and diagnosis of overlays may lead to data integrity problems and system outages. Due to the severity in the nature of these problems, it is incumbent to diagnose and resolve overlays quickly. Unfortunately in today's environment, there are often few clues as to who caused the overlay.

SUMMARY OF THE INVENTION

In light of the foregoing, a need exists for a mechanism for improved diagnosis and identification of overlays in data processing/data storage computing environments. Furthermore, other desirable features and characteristics of the present invention will become apparent from the subsequent detailed description of the invention and the appended claims, taken in conjunction with the accompanying drawings and this summary of the invention.

Accordingly, in one embodiment, by way of example only, a method for identifying an overlay of a data processing target structure in a computing environment is provided. At least one of examining a mapping macro for the target structure with a set of valid ranges, comparing the set of valid ranges with the target structure to identify a string of at least one first invalid value and a last invalid value and locate invalid regions of the target structure, and examining executable code associated with the target structure, comparing at least one unchanged module against at least one additional module exhibiting an overlay characteristic to identify the string of the at least one first invalid value and the last invalid value and locate invalid regions of the target structure, is performed. Scanning through a dump to identify each instance of the string of the at least one first invalid value and the last invalid value is also performed. Searching backwards from an address of a program storage word (PSW) to identify an eye catcher and comparing the eye catcher to a library of original equipment manufacturer (OEM) eye catcher constants to identify the owner, are also performed.

In an additional embodiment, again by way of example only, a system for identifying an overlay of a data processing target structure in a computing environment is provided. The system includes a processing module operational in the computing environment. The processing module is in communication with the data processing target structure. The processing module is adapted for performing at least one of examining a mapping macro for the target structure with a set of valid ranges, comparing the set of valid ranges with the target structure to identify a string of at least one first invalid value and a last invalid value and locate invalid regions of the target structure, and examining executable code associated with the target structure, comparing at least one unchanged module against at least one additional module exhibiting an overlay characteristic to identify the string of the at least one first invalid value and the last invalid value and locate invalid regions of the target structure. The processor module is further configured for scanning through a dump to identify each instance of the string of the at least one first invalid value and the last invalid value, searching backwards from an address of a program storage word (PSW) to identify an eye catcher, and comparing the eye catcher to a library of original equipment manufacturer (OEM) eye catcher constants to identify the owner.

In still another embodiment, again by way of example only, a computer program product is provided for identifying an overlay of a data processing target structure in a computing environment. The computer program product comprises a computer-readable storage medium having computer-readable program code portions stored therein. The computer-readable program code portions comprise a first executable portion for performing at least one of examining a mapping macro for the target structure with a set of valid ranges, comparing the set of valid ranges with the target structure to identify a string of at least one first invalid value and a last invalid value and locate invalid regions of the target structure, and examining executable code associated with the target structure, comparing at least one unchanged module against at least one additional module exhibiting an overlay characteristic to identify the string of the at least one first invalid value and the last invalid value and locate invalid regions of the target structure. Computer code for scanning through a dump to identify each instance of the string of the at least one first invalid value and the last invalid value is also included. Computer code for searching backwards from an address of a program storage word (PSW) to identify an eye catcher, and computer code for comparing the eye catcher to a library of original equipment manufacturer (OEM) eye catcher constants to identify the owner are also included.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The following description and claimed subject matter is directed to a set of related methodologies to be used to identify overlays in a data processing target structure. As background, a typical organization of hardware and software components within a data processing system is described prior to describing the present invention in more detail.

Figure 1A:
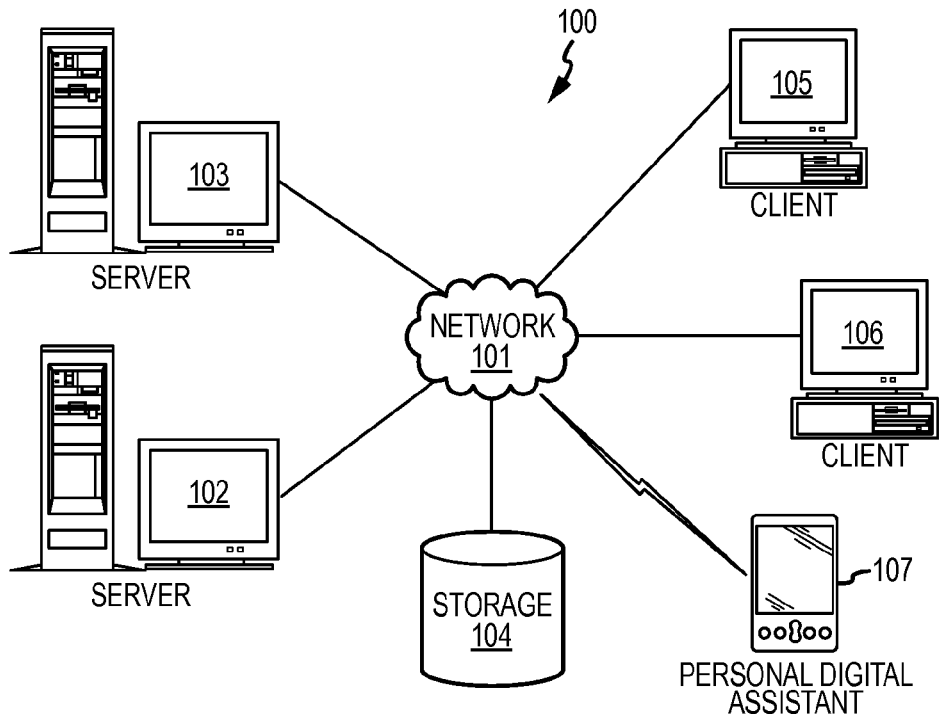
FIG. 1A depicts an exemplary data processing system in which the present invention may be implemented.

With reference now to the figures, FIG. 1A depicts a typical data processing system in which the present invention may be implemented. Data processing system 100 contains network 101, which is the medium used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 may be a variety of computing devices, such as personal computers, personal digital assistants (PDAs), etc. Distributed data processing system 100 may include additional servers, clients, and other devices not shown. In the depicted example, distributed data processing system 100 may include the Internet with network 101 representing a worldwide collection of networks and gateways that use the TCP/IP suite of protocols to communicate with one another. Of course, distributed data processing system 100 may also be configured to include a number of different types of networks, such as, for example, an intranet, a local area network (LAN), or a wide area network (WAN).

FIG. 1A is intended as an example of a heterogeneous computing environment and not as an architectural limitation for the present invention. The present invention could be implemented on a variety of hardware platforms, such as server 102 or client 107 shown in FIG. 1A. Requests for the collection of overlay information may be initiated on a first device within the network, while a second device within the network receives the request, identifies and collects the overlay information for applications executing on the second device, and returns the collected data to the first device.

Figure 1C:
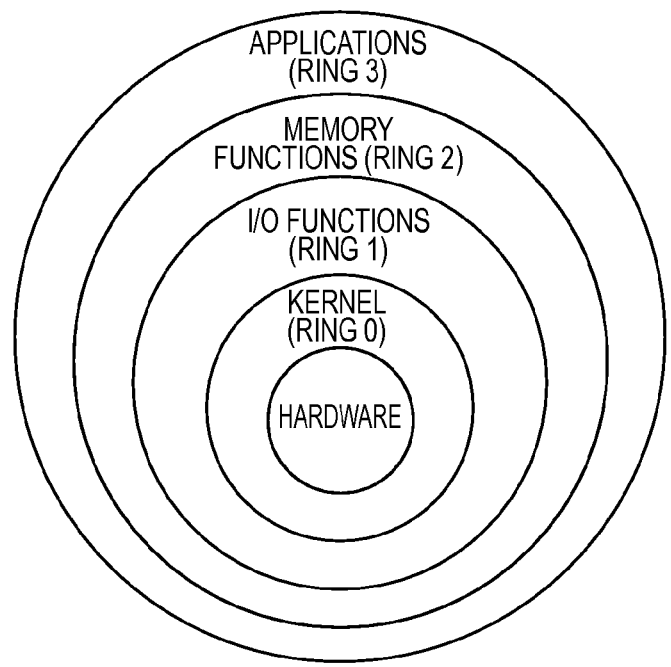
FIG. 1C depicts an exemplary software components within a computer system illustrating a logical relationship between the components as functional layers of software.
Figure 1B:
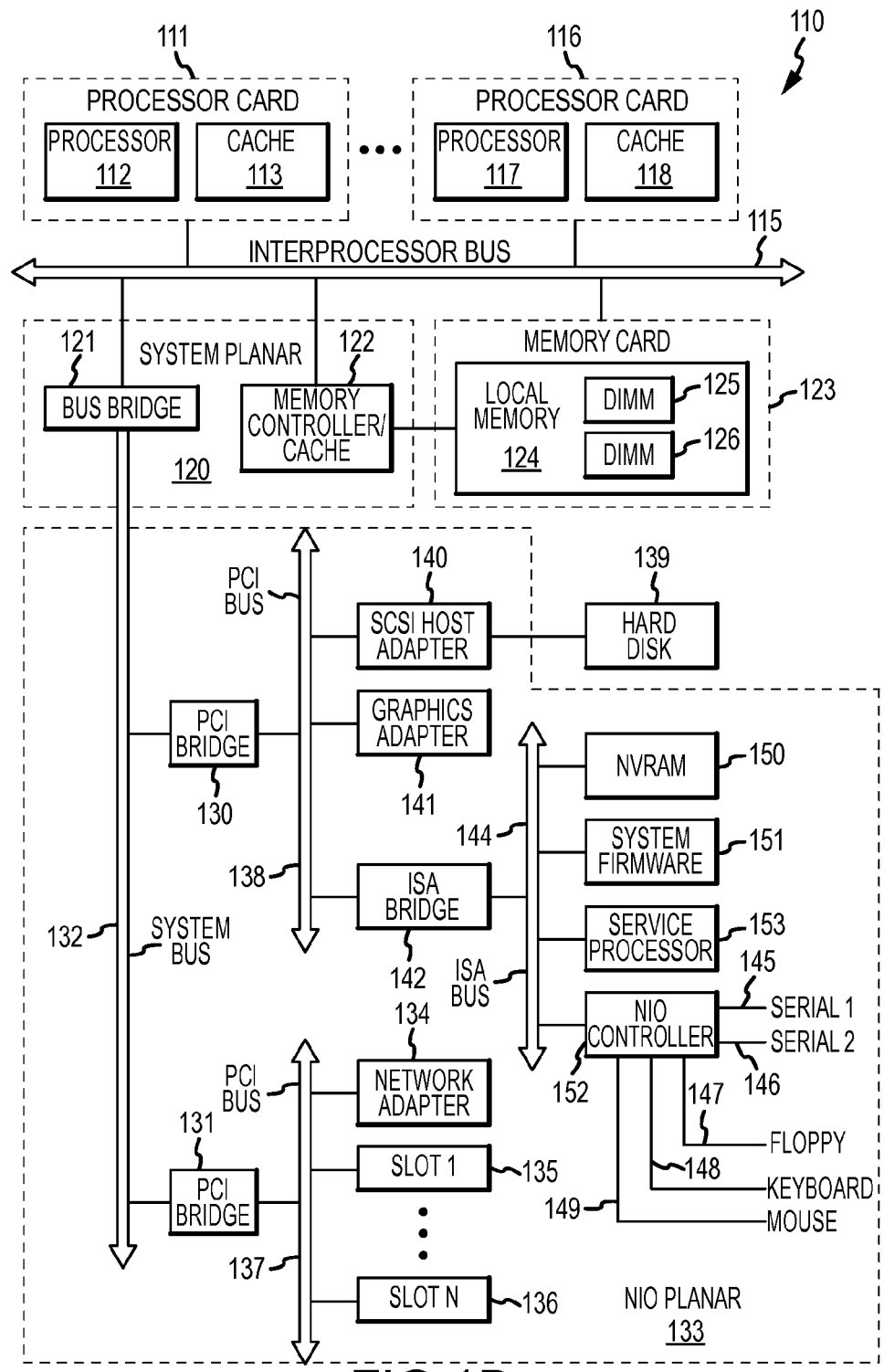
FIG. 1B depicts an exemplary computer architecture that may be used within a client or server in which the present invention may be implemented.

With reference now to FIG. 1B, a diagram depicts a typical computer architecture that may be used within a client or server, such as those shown in FIG. 1A, in which the present invention may be implemented. Data processing system 110 employs a variety of bus structures and protocols. Processor card 111 contains processor 112 and level two (L2) cache 113 that are connected to interprocessor bus 115. System 110 may contain a plurality of processor cards; processor card 116 contains processor 117 and L2 cache 118. Interprocessor bus 115 supports system planar 120 that contains bus bridge 121 and memory controller 122 that supports memory card 123. Memory card 123 contains local memory 124 consisting of a plurality of dual in-line memory modules (DIMMs) 125 and 126.

Interprocessor bridge 121 connects to PCI bridges 130 and 131 via system bus 132. PCI bridges 130 and 131 are contained on native I/O (NIO) planar 133 which supports a variety of I/O components and interfaces. PCI bridge 131 provides connections for external data streams through network adapter 134 and a number of card slots 135-136 via PCI bus 137. PCI bridge 130 connects a variety of I/O devices via PCI bus 138. Hard disk 139 may be connected to SCSI host adapter 140, which is connected to PCI bus 138. Graphics adapter 141 may also be connected to PCI bus 138 as depicted, either directly or indirectly.

ISA bridge 142 connects to PCI bridge 130 via PCI bus 138. ISA bridge 142 provides interconnection capabilities through NIO controller 152 via ISA bus 144, such as serial connections 145 and 146. Floppy drive connection 147 provides removable storage. Keyboard connection 148 and mouse connection 149 allow data processing system 110 to accept input data from a user.

Non-volatile RAM (NVRAM) 150 provides non-volatile memory for preserving certain types of data from system disruptions or system failures, such as power supply problems. System firmware 151 is also connected to ISA bus 144 and controls the initial BIOS. Service processor 153 is connected to ISA bus 144 and provides functionality for system diagnostics or system servicing.

Those of ordinary skill in the art will appreciate that the hardware in FIG. 1B may vary depending on the system implementation. For example, the system may have one or more processors, and other peripheral devices may be used in addition to or in place of the hardware depicted in FIG. 1B. The depicted examples are not meant to imply architectural limitations with respect to the present invention.

With reference now to FIG. 1C, an exemplary diagram shows software components within a computer system illustrating a logical relationship between the components as functional layers of software. The kernel (Ring 0) of the operating system provides a core set of functions that acts as an interface to the hardware. I/O functions and drivers can be viewed as resident in Ring 1, while memory management and memory-related functions are resident in Ring 2. User applications and other programs (Ring 3) access the functions in the other layers to perform general data processing. Rings 0-2, as a whole, may be viewed as the operating system of a particular device. Assuming that the operating system is extensible, software drivers may be added to the operating system to support various additional functions required by user applications, such as device drivers for support of new devices added to the system.

In addition to being able to be implemented on a variety of hardware platforms, the present invention may be implemented in a variety of software environments. A typical operating system (OS) may be used to control program execution within each data processing system. For example, one device may run a Linux® operating system, while another device may run an AIX® operating system.

Figure 1D:
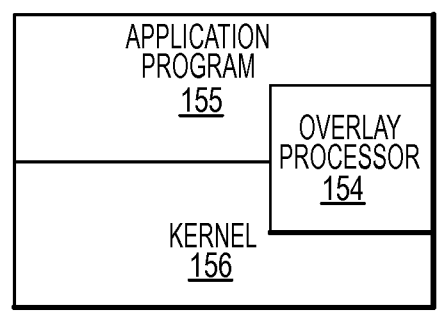
FIG. 1D depicts an exemplary relationship between software components in a data processing system that is being analyzed in some manner by an overlay processor module.

With reference now to FIG. 1D, a simple block diagram depicts an exemplary relationship between software components in a data processing system that is being analyzed in some manner by an overlay identification mechanism. Overlay processor (module) 154 is used to analyze application program 155 in conjunction with a data processing target structure (e.g., storage 104, FIG. 1A or elsewhere). Overlay processor 154 may include, or may be in communication with, a trace program/module configured to handle a subset of interrupts on the data processing system that is being analyzed. When an interrupt or trap occurs, e.g., a single-step trap or a taken-branch trap (for branch traces), functionality within or associated with the overlay processor 154 can perform various tracing functions, profiling functions, or debugging functions; hereinafter, the terms tracing, profiling, and debugging are used interchangeably. Overlay processor 154 may adapted to examine various data processing modules, such as mapping macros for the target structure as will be further explained. Overlay processor may additionally scan executable code of the application program 155, again as will be described.

Both overlay processor 154 and application program 155 use kernel 156, which comprises and/or supports system-level calls, utilities, and device drivers. Depending on the implementation, overlay processor 154 may have some modules that run at an application-level priority and other modules that run at a trusted, system-level priority with various system-level privileges.

In many cases, an overlay is caused by a move character (MVC) or a move character long (MVCL) instruction. This instruction takes data from one location and moves it to another location. If the target address of the instruction is incorrect, the instruction overlays the wrong storage. The following methodologies diagnose these types of problems, determines where the overlaying data originated, and finally, determines an owner of the overlaid data. In most cases, the owner of the overlaid data is generally responsible for the overlay. In identifying overlays, the following mechanisms automatically determine the range of a block or code module that has been overlaid. A library of original equipment manufacturer (OEM) eye catchers and code sections are used or created to assist in identifying owners of the overlaid storage.

As a first step, a determination is made as to how much of the target structure was overlaid. The following mechanisms may accomplish this determination in two ways. First, a mapping macro for the overlaid target structure is used in view of a set of preexisting valid ranges. The valid ranges would be inserted into the mapping macro at time of declaration. A mapping macro is a set of declared variables that is used to describe an area of storage that has been obtained to contain variable data. In other words, a program gets a block of storage to use for variables. The offset locations of each variable contained within that block are mapped to the block via a mapping macro. The mapping macro has the offset, size, and characteristic of each variable within the storage block. As implemented in the present invention, the mapping macro also contains valid ranges for these fields (e.g., all numeric, all alphabetic, numeric between 0 and 10).

When a control block or data structure is located that is suspected to be overlaid, the block or structure may be scanned and a determination may be made where the first invalid value occurs and the last invalid value occurs. This gives a beginning and an ending range for the overlaid portion of the data.

As an alternative, the executable code for the application program/data structure is examined. Since some diagnostic systems have access to code at a specific customer level, the contents of unchanged modules may be compared against those modules exhibiting overlay characteristics to locate invalid areas of storage. Using one of the previous alternatives, the string of data (from the first invalid value to the last invalid value) is used for succeeding analysis.

As a next step, the dump may be scanned to find each instance where the invalid string described above exists. If the overlay is due to a MVC or MVCL instruction as previously described, then the string existed in an additional location. When the string is found, it is incumbent to identify who owns the string, since generally the owner is most likely the cause of the overlay.

In identifying an owner of the bad string, several methodologies may be brought to bear. A first methodology involves scanning through the system trace (systrace) and searching through entries, such as through each GETMAIN (a computer information control system application programming interface (CISC API) command) request. It is beneficial to begin at the bottom of the systrace and work backwards, since the most current entries are located at the bottom. The beginning offset of storage that was obtained through the length of storage obtained is examined to determine if the address of the bad string is contained within that block.

If the address of the bad string is contained within the block, then the program status word (PSW) may be obtained from the systrace entry. The PSW address shows who called to get the storage. In some cases, an IPCS WHERE command issued against the address will show the load module (loadmod) where a GETMAIN is issued, and the program name will then be known. This is the simplest case.

In most cases, however, IPCS WHERE may not be effective. In these cases, it is possible to go to the location of the address in the PSW and search backwards for an eye catcher. An eye catcher is a somewhat standardized convention that most applications use to identify themselves. Eye catchers generally have a maintenance level, a module name, and a company name with a copyright notice.

A library of OEM eye catcher constants may be maintained to compare with the identification of an eye catcher as described above. If an eye catcher is found, a product name for the bad storage is identified. For those items without a standard copyright notice, a search may be made of text-readable extended binary code decimal interchange code (EBCDIC) characters, reporting a list of those found back to a user. The user will then identify the characters. The characters may then be added to the OEM eye catcher library for future reference.

For those programs without eye catcher information, a section of code where the initial branch into the application program is made may be identified as a constant string, and used to identify that particular program in the future. As long as that portion of code does not change, it remains reliable as an eye catcher. In general, the beginning of most programs tend to change less than the middle and ending sections of the program, since the invocation parameters are less likely to change during normal maintenance. The user would need to know based on the characteristics of that code, what program it belongs to, and flag the code accordingly in the OEM eye catcher library. As a result, a database of known strings may be developed as eye catchers to identify storage owners. It will become easier over time to identify which application owns the storage with the bad string as the database grows.

A further improvement to the methodologies described above may be made by enhancing current virtual storage manager code to store the PSW of a GETMAIN request in a system storage mapping table. With this improvement, the requirement of searching through systrace entries may be eliminated, as the PSW may be obtained from the storage mapping table.

Figure 2:
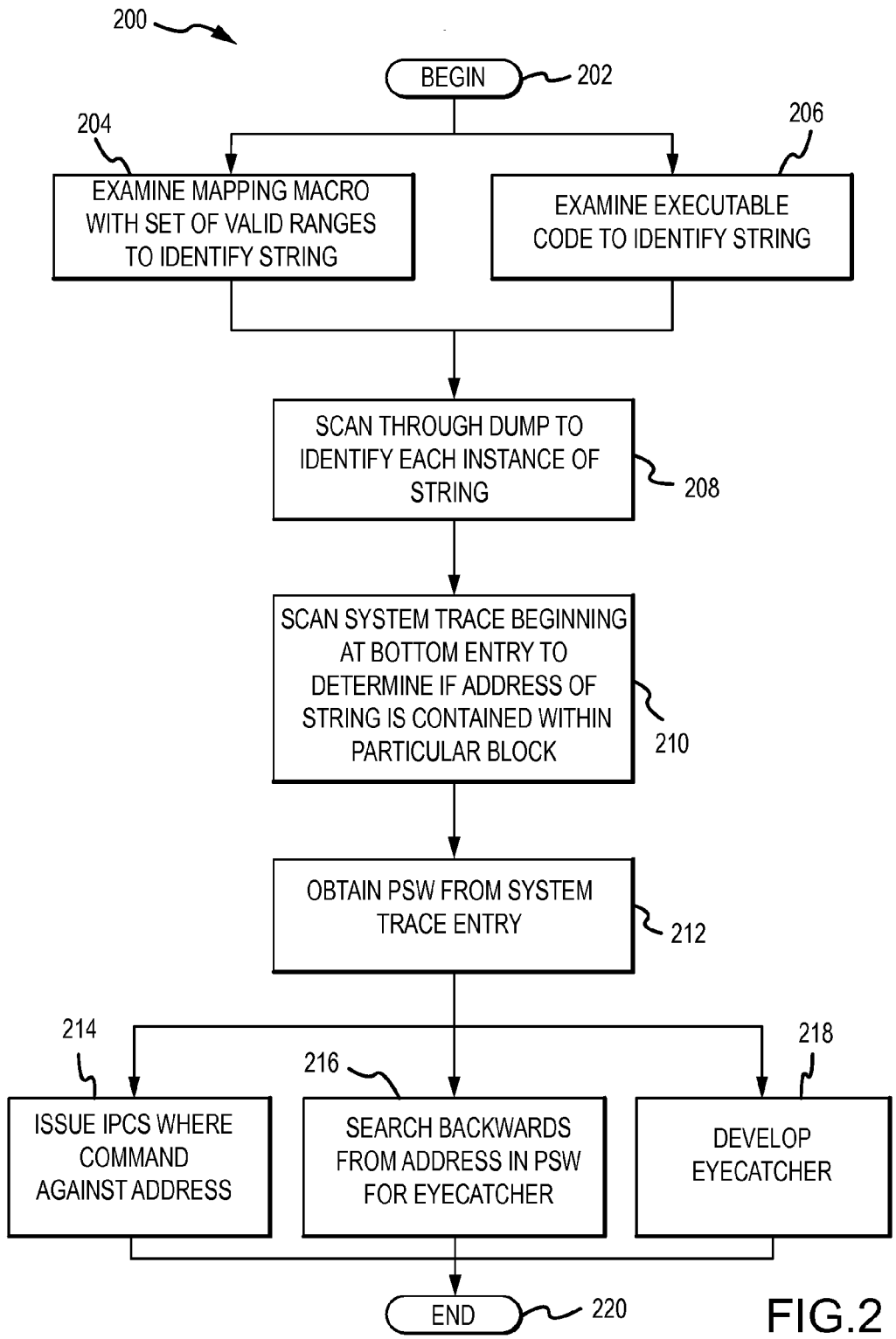
FIG. 2 illustrates an exemplary method for identifying an overlay of a data processing target structure.

Turning to FIG. 2, a diagram of an exemplary method 200 for identifying an overlay of a data processing target structure in a computing environment is depicted. As one skilled in the art will appreciate, various steps in the method 200 may be implemented in differing ways to suit a particular application. In addition, the described method 200 may be implemented by various means, such as hardware, software, firmware, or a combination thereof operational on or otherwise associated with the blade server environment. For example, the method 200 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 200 begins (step 202) with the performance of at least one of the following steps 204 and/or 206. In step 204, a mapping macro for the target structure is examined in view of a set of valid ranges to identify the bad string as previously described. Here again, the bad string consists of the first invalid value to the last invalid value identified. In step 206, executable code associated with the target structure is examined, comparing known modules against suspect modules to identify the bad string.

Following the performance of steps 204 or 206, the dump is scanned to identify each instance of the string (step 208). Systrace entries are then scanned, starting at a bottom entry, to determine if the address of the bad string is contained within a particular block of data (step 210). In one embodiment, the scan of systrace entries involves searching through every GETMAIN request as previously described.

If the address of the bad string is contained within the block, the PSW for the entry is obtained (step 212). Again, one of the following steps 214, 216, and 218 may be performed to identify the storage owner. In step 214, an IPCS WHERE command is issued against the address. In step 216, a search is made backwards from the address in the PSW for an eye catcher. In one embodiment, this search may involve a comparison between known OEM eye catchers in a database as previously described. Finally, in step 218, an eye catcher may be developed as previously described, such as by designating a constant string as such. The eye catcher may be added to the database of known eye catchers for subsequent analysis. The method 200 then ends (step 220).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method executable by a central processing unit (CPU) for identifying an overlay of a data processing target structure in a computing environment, comprising:
   performing at least one of:
      examining a mapping macro for the target structure with a set of valid ranges, comparing the set of valid ranges with the target structure to identify a string of at least one first invalid value and a last invalid value and locate invalid regions of the target structure, and
      examining executable code associated with the target structure, comparing at least one unchanged module against at least one additional module exhibiting an overlay characteristic to identify the string of the at least one first invalid value and the last invalid value and locate invalid regions of the target structure;
   scanning through a dump to identify each instance of the string of the at least one first invalid value and the last invalid value;
   searching backwards from an address of a program storage word (PSW) to identify an eye catcher; and
   comparing the eye catcher to a library of original equipment manufacturer (OEM) eye catcher constants to identify the owner and product name.

2. The method of claim 1, wherein searching backwards includes searching for text-readable extended binary code decimal interchange code characters and compiling a list of the characters.

3. The method of claim 1, further including adding the list of characters to the library of OEM eye catcher constants for future reference.

4. The method of claim 1, further including, subsequent to scanning through the dump:
   scanning a system trace, beginning at a bottom entry of the system trace as a first entry, to determine if an address of the string is contained within a block of data, wherein if the address is contained within the block of data, a program storage word (PSW) is obtained to identify an owner of the overlay.

5. The method of claim 4, further including issuing an IPCS WHERE command against the address to identify the owner.

6. The method of claim 1, further including, if the eye catcher is not available, developing the eye catcher by designating a constant string to identify storage owners and adding the constant string to the library of OEM eye catchers.

7. A system for identifying an overlay of a data processing target structure in a computing environment, comprising:
a central processing unit (CPU); and
a processing module operational in the computing environment, the processing module in communication with the data processing target structure, wherein the processing module is adapted for performing at least one of:
examining a mapping macro for the target structure with a set of valid ranges, comparing the set of valid ranges with the target structure to identify a string of at least one first invalid value and a last invalid value and locate invalid regions of the target structure, and
examining executable code associated with the target structure, comparing at least one unchanged module against at least one additional module exhibiting an overlay characteristic to identify the string of the at least one first invalid value and the last invalid value and locate invalid regions of the target structure; and
the processing module is further configured for:
scanning through a dump to identify each instance of the string of the at least one first invalid value and the last invalid value;
searching backwards from an address of a program storage word (PSW) to identify an eye catcher; and
comparing the eye catcher to a library of original equipment manufacturer (OEM) eye catcher constants to identify the owner and product name.

8. The system of claim 7, wherein the processing module is further configured for searching for text-readable extended binary code decimal interchange code characters and compiling a list of the characters.

9. The system of claim 7, wherein the processing module is further configured for adding the list of characters to the library of OEM eye catcher constants for future reference.

10. The system of claim 7, wherein the processing module is further configured for, subsequent to scanning through the dump:
scanning a system trace, beginning at a bottom entry of the system trace as a first entry, to determine if an address of the string is contained within a block of data, wherein if the address is contained within the block of data, a program storage word (PSW) is obtained to identify an owner of the overlay.

11. The system of claim 7, wherein the processing module is further configured for issuing an IPCS WHERE command against the address to identify the owner.

12. The system of claim 7, wherein the processing module is further configured for, if the eye catcher is not available, developing the eye catcher by designating a constant string to identify storage owners and adding the constant string to the library of OEM eye catchers.

13. A computer program product for identifying an overlay of a data processing target structure in a computing environment, the computer program product comprising a computer-readable non-transitory storage medium having computer-readable program code portions stored therein, the computer-readable program code portions comprising:
computer code for performing at least one of:
examining a mapping macro for the target structure with a set of valid ranges, comparing the set of valid ranges with the target structure to identify a string of at least one first invalid value and a last invalid value and locate invalid regions of the target structure, and
examining executable code associated with the target structure, comparing at least one unchanged module against at least one additional module exhibiting an overlay characteristic to identify the string of the at least one first invalid value and the last invalid value and locate invalid regions of the target structure;
computer code for scanning through a dump to identify each instance of the string of the at least one first invalid value and the last invalid value;
computer code for searching backwards from an address of a program storage word (PSW) to identify an eye catcher; and
computer code for comparing the eye catcher to a library of original equipment manufacturer (OEM) eye catcher constants to identify the owner and product name.

14. The computer program product of claim 13, further comprising computer code for searching for text-readable extended binary code decimal interchange code characters and compiling a list of the characters.

15. The computer program product of claim 13, further comprising computer code for adding the list of characters to the library of OEM eye catcher constants for future reference.

16. The computer program product of claim 13, further comprising computer code for, subsequent to scanning through the dump:
scanning a system trace, beginning at a bottom entry of the system trace as a first entry, to determine if an address of the string is contained within a block of data, wherein if the address is contained within the block of data, a program storage word (PSW) is obtained to identify an owner of the overlay.

17. The computer program product of claim 16, further comprising computer code for issuing an IPCS WHERE command against the address to identify the owner.

18. The computer program product of claim 13, further comprising computer code for, if the eye catcher is not available, developing the eye catcher by designating a constant string to identify storage owners and adding the constant string to the library of OEM eye catchers.

* * * * *